United States Patent [19]
Orendorf et al.

[11] Patent Number: 5,107,704
[45] Date of Patent: * Apr. 28, 1992

[54] LOAD WHEEL SURFACE CONDITIONER

[76] Inventors: Daniel C. Orendorf, 12996 Jamestown Ave., Uniontown, Ohio 44685; Barry L. Kline, 917 Mull Ave., #1K, Akron, Ohio 44313; Edward Pavkov, 6173 Taylor Rd., Box 321, R.D. #1, Doylestown, Ohio 44230

[*] Notice: The portion of the term of this patent subsequent to Mar. 3, 2007 has been disclaimed.

[21] Appl. No.: 168,872

[22] Filed: Mar. 15, 1988

[51] Int. Cl.$^5$ ............................................. G01M 17/02
[52] U.S. Cl. .................................................. 73/146; 15/181
[58] Field of Search ...................... 73/146; 15/181, 179

[56] References Cited

U.S. PATENT DOCUMENTS 3,839,763  10/1974  Gould .................................... 15/181
3,855,659  12/1974  Grambor ................................ 15/181

Primary Examiner—Donald O. Woodiel
Attorney, Agent, or Firm—Hurt, Richardson, Garner

[57] ABSTRACT

The apparatus of the invention includes a mounting frame which is pivotally mounted on the load drum carriage and is pivotally positioned by a pneumatic positioner. A cleaning brush assembly is rotatably mounted on the mounting frame so that, as the actuater moves the mounting frame toward the load drum surface, the cleaning brush assembly engages the periphery of the load drum to clean same. A drive motor is provided for rotating the cleaning brush assembly as it is pressed against the surface of the drum. The pneumatic actuator is connected to a regulated fluid pressure source so that the force with which the cleaning brush assembly is pressed against the drum surface can be regulated and is maintained below the unloaded threshhold force at which the load drum controller is set to prevent automatically rezeroing the load set point of the load drum.

16 Claims, 3 Drawing Sheets

LOAD WHEEL SURFACE CONDITIONER

BACKGROUND OF THE INVENTION

Most pneumatic vehicular tires manufactured today are tested and adjusted if needed on a tire uniformity machine or optimizer commonly known as a TUO in the industry. The tire uniformity machine applies a load to the tire tread while it is inflated with a load drum, sometimes called a roadwheel or load wheel in the trade. Since such a tire uniformity machine normally processes many tires each day, material from the tire is transferred to the surface of the load drum. As this material accumulates, the force readings of the tire are influenced. This necessitates the cleaning of the peripheral surface of the load drum to ensure correct force readings of the tire thereagainst.

In the past, the load drums have been periodically manually cleaned using any number of materials usually including appropriate solvents since the material is typically a silicant or decomposed silicone known as polydimethodaldiloxene. Because such manual cleaning operations were time consuming from a machine down time standpoint and also from a labor standpoint, this cleaning procedure has not been very effective in overcoming the problem associated with the accumulation of material on the load drum surface. As a result, there remains a need for a means for automatically cleaning the load drum of a tire uniformity machine to ensure accurate readings while at the same time minimizing personnel time to carry out the cleaning operation.

SUMMARY OF THE INVENTION

These and other problems and disadvantages associated with the prior art are overcome by the invention disclosed herein by providing a cleaning means which automatically cleans the load drum in a force variation tire uniformity machine without affecting the operation of the machine or the duty cycle of the machine. The load drum is cleaned while the drum is not being used in the force variation measuring cycle and the load drum is not loaded sufficiently to affect the automatic rezero load threshold while the load drum is unloaded. Thus, the load drum is cleaned with sufficient frequency to prevent any buildup of material thereon to affect the force variation measurements and also does not require any additional personnel time to carry out the cleaning operation.

The apparatus of the invention includes a mounting frame which is pivotally mounted on the load drum carriage and is pivotally positioned by a pneumatic positioner. A cleaning brush assembly is rotatably mounted on the mounting frame so that, as the actuater moves the mounting frame toward the load drum surface, the cleaning brush assembly engages the periphery of the load drum to clean same. A drive motor is provided for rotating the cleaning brush assembly as it is pressed against the surface of the drum. The pneumatic actuator is connected to a regulated fluid pressure source so that the force with which the cleaning brush assembly is pressed against the drum surface can be regulated and is maintained below the unloaded threshold force at which the load drum controller is set to prevent automatically rezeroing the load set point of the load drum.

These and other features and advantages of the invention disclosed herein will become more apparent upon consideration of the following detailed description and accompanying drawings wherein like characters of reference designate corresponding parts throughout the several views and in which:

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Figure 1:
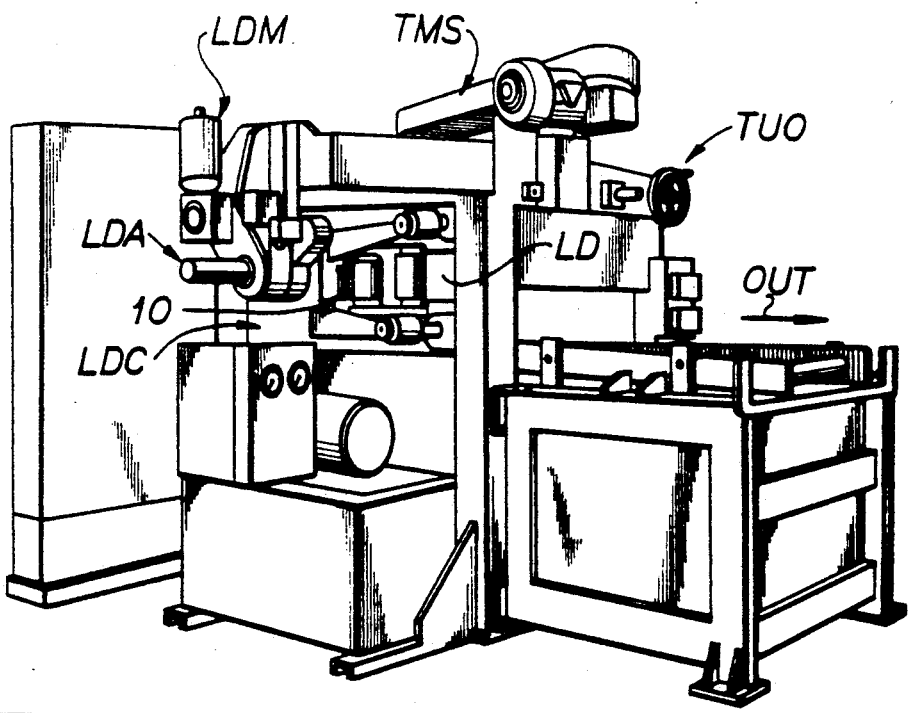
FIG. 1 is a perspective view of a tire uniformity maching incorporating the invention therein.

Referring to FIG. 1, it will be seen that the invention is incorporated in a tire uniformity machine TUO which is equipped with a load drum asssembly LDA and a tire mounting spindle assembly TMS. The pneumatic tire is conveyed into the machine, where it is chucked up on appropriate mandrels in the tire mounting spindle assembly TMS and rotated. The loading drum assembly includes a load drum carriage LDC which rotatably mounts therein a load drum LD. The load drum carriage LDC and thus the load drum LD are driven toward and away from the tire in the machine with a load drum motor LDM.

Figure 5:
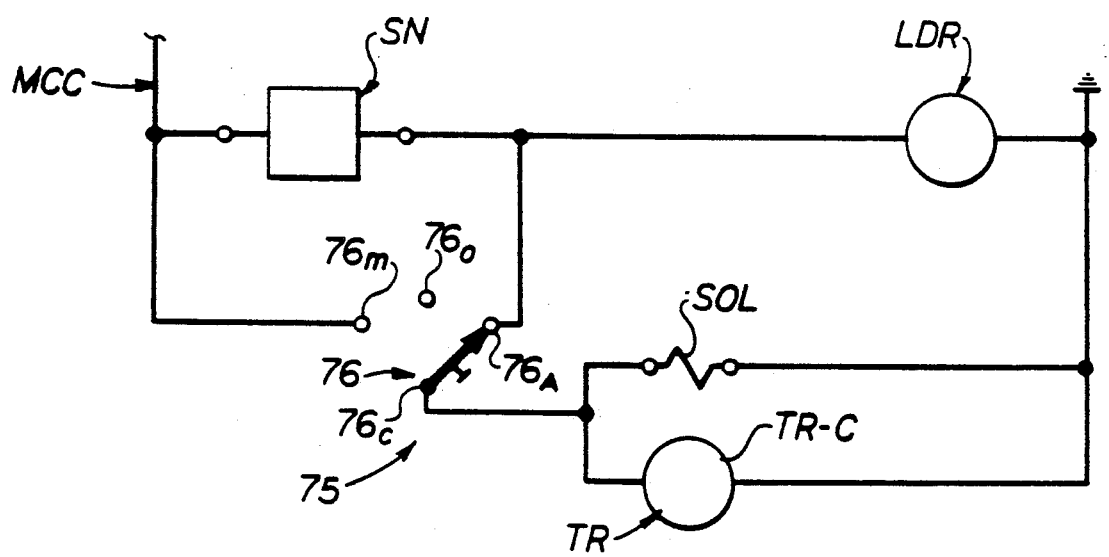
Figure 5:
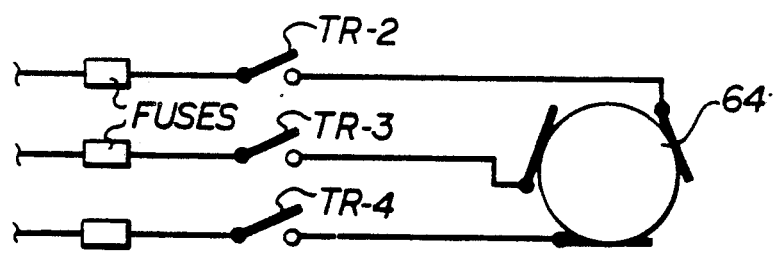

The connection between the load drum LD and the load drum carriage LDC is provided with load sensors which disable the load drum motor LDM with a motor control relay LDR seen in FIG. 5. The load drum control relay LDR is controlled through a load sensing switch network SN so that, when the load drum motor LDM is activated, the switch network SN energizes relay LDR until a predetermined load is exerted on the tire by the load drum LD whereupon the control relay LDR is de-energized.

As also best seen in FIG. 1, the loading drum periphery cleaner 10 is mounted on the load drum carriage LDC so that the cleaner 10 moves with the carriage LDC as the carriage moves back and forth toward and away from the tire in the machine TUO. The cleaner 10 is illustrated with one specific location, however, it will be understood that different arrangements may be included provided the peripheral surface PS of the drum LD can be contacted by the cleaner 10.

Figure 2:
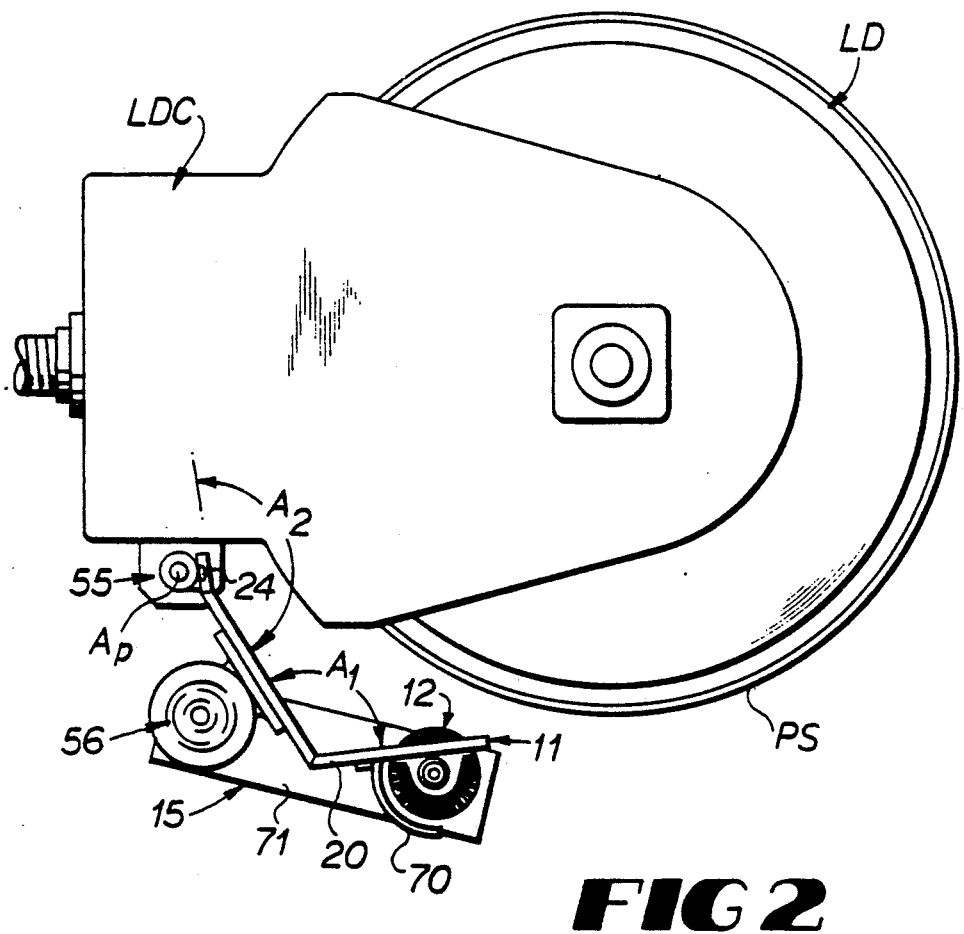
FIG. 2 is a top view of the loading drum assembly with the automatic load drum periphery cleaner of the invention mounted thereon.
Figure 3:
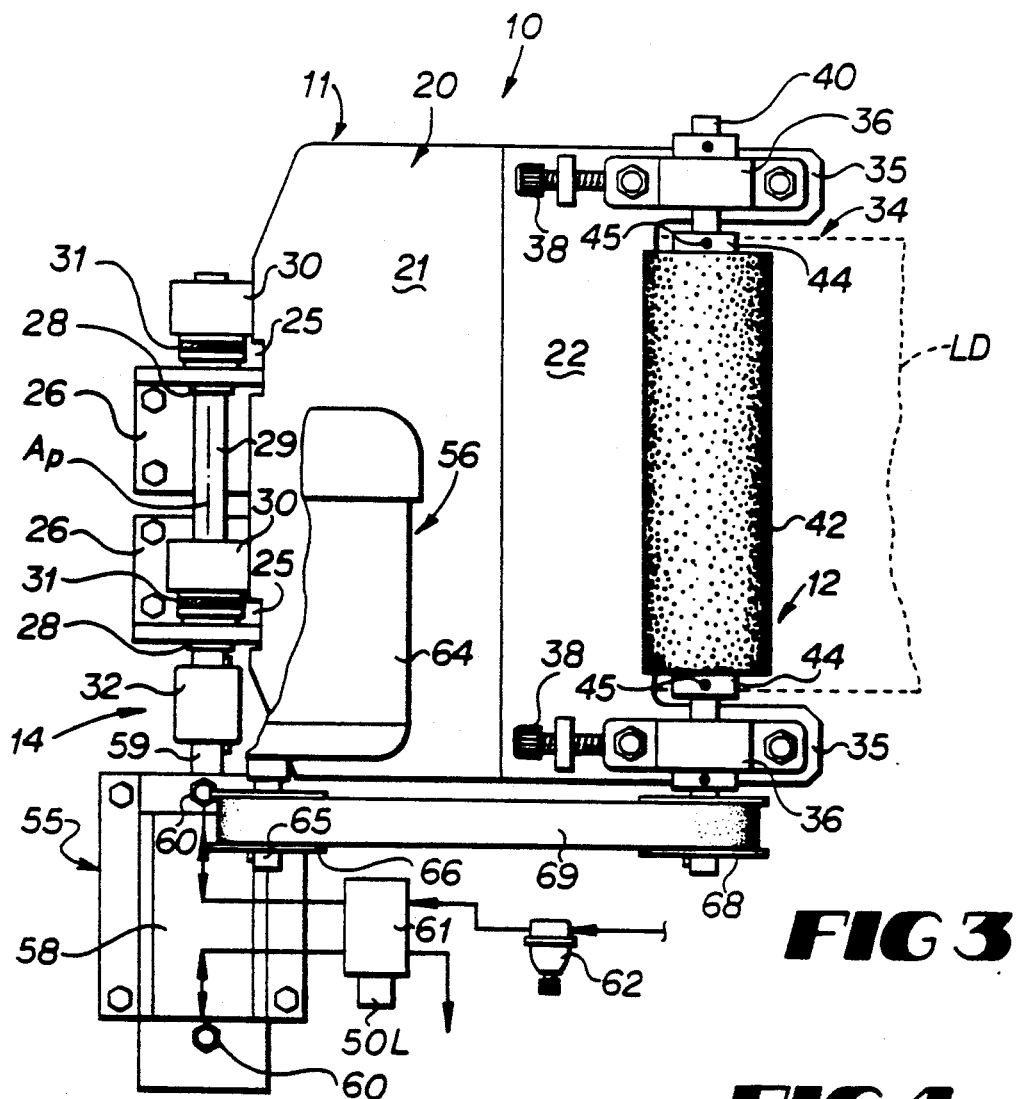
FIG. 3 is an enlarged side view of the automatic load drum periphery cleaner.

As seen in FIGS. 2 and 3, the cleaner 10 includes generally a mounting frame 11 pivotally mounted on the load drum carriage LDC with a cleaning brush assembly 12 rotatably mounted on the frame 11 so as to engage the peripheral surface PS of the drum LD as the mounting frame 11 is pivoted toward the drum LD as will become more apparent. A drive assembly 14 is provided for pivoting the mounting frame 11 and also effecting relative rotational movement between the cleaning brush assembly 12 and the peripheral surface of the load drum LD. Appropriate covers 15 are provided for covering the brush and the belt and the pulley arrangement, as will become more apparent.

The mounting frame 11 includes a base plate 20 which includes a planar central section 21 with a generally rectilinear shape. The forward edge of the central section 21 is integral with a planar front section 22 which defines an included angle $A_1$, as seen in FIG. 2 of about 115°. As will become more apparent, the angle $A_1$ is sufficient to provide clearance of the load drum carriage LDC when the cleaner 10 is in operation.

The rear edge of the central section 21 is integral with a plurality of mounting tabs 24 as seen in FIG. 2, integral with the central section 21 and extending outwardly therefrom with an included angle $A_2$ illustrated at about 150°. The angles $A_1$ and $A_2$ are selected so that the mounting tabs 24 are about perpendicular to the front section 22 as will become more apparent although different angles may be utilized. The mounting tabs 24 define bracket cutouts 25 therebetween to permit free operation of the mounting frame 11 as will become more apparent.

A pair of pivot bearing brackets 26 are provided which are attached to the load drum carriage LDC adjacent the opening at which the peripheral surface of the loading drum LD passes as best seen in FIGS. 2 and 3. Each of the pivot bearing brackets 26 mounts a flange bearing 28 therein which in turn rotatably mounts pivot shaft 29 therein. Each of the mounting tabs 24 fixedly mounts a connector collar 30 thereon which is in turn pinned or keyed to the pivot shaft 29 so that rotation of the pivot shaft 29 causes the connector collar 30 to rotate therewith rotating the base plate 20. Thus, it will be seen that pivoting the pivot shaft 29 serves to pivot the base plate 20 which in turn moves the cleaning brush assembly 12 toward and away from the peripheral surface PS of the load drum LD. A thrust bearing 31 is placed between each of the connector collars 30 and the flange on the flange bearing 28 to permit the axial relationship of the shaft 29 relative to the brackets 29 to remain fixed while still permitting the pivot shaft 29 to freely pivot. One end of the pivot shaft 29 projects beyond the bracket 26 and is keyed to an appropriate shaft connector 32 which is in turn connected to the drive assembly 14 so that the pivot shaft 29 can be pivoted.

The forward section of the front place section 22 is provided with a brush cutout 34 sized to expose the cleaning brush assembly 12 to the peripheral surface PS of the drum LD. This forms a pair of spaced apart mounting sections 35 on the forwardly extending end of the base plate 20 to rotatably mount the cleaning brush assembly 12 therein.

A pair of pillow block bearings 36 are mounted on the mounting sections 35 and are operatively associated with microadjustment mechanisms 38 to permit belt tension and brush alignment to be maintained as will become more apparent.

Figure 4:
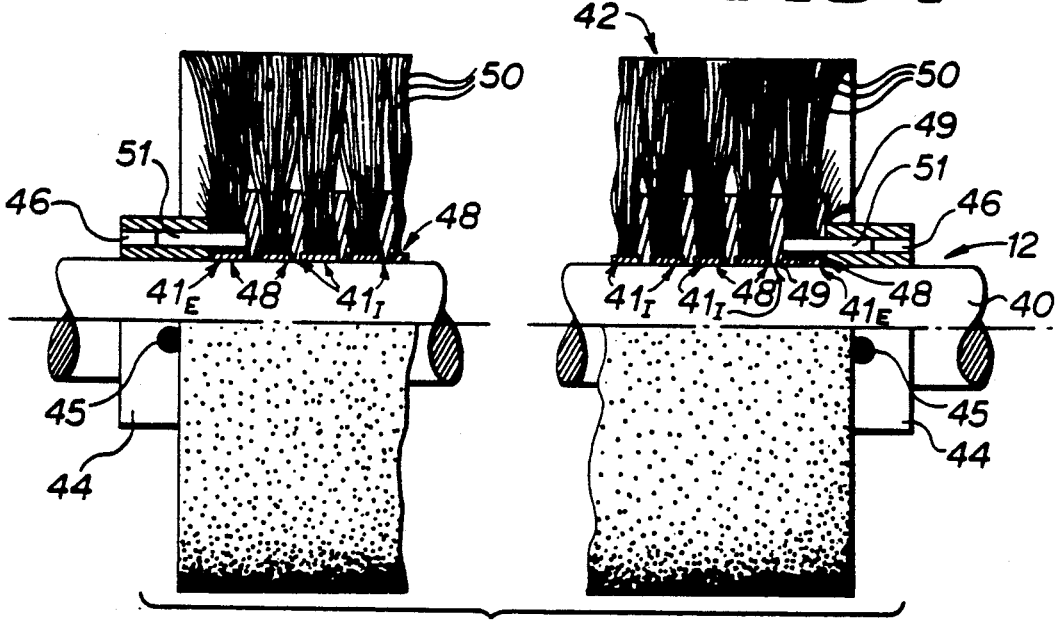
FIG. 4 is an enlarged partial longitudinal cross-sectional view of the cleaning brush assemblies; and, FIG. 5 is an electrical schematic illustrating the connection of the control circuit of the invention into the control circuit on the tire uniformity machine.

The cleaning brush assembly 12 as seen in FIGS. 3 and 4 includes a brush shaft 40 which is rotatably journaled in the pillow block bearings 36 with one end of the brush shaft 40 projecting beyond the bearings 36 to be driven as will become more apparent. The shaft 40 mounts a plurality of brushes 41 to form a brush set 42 with the brush set 42 operating as a single brush as will become more apparent. Brushes 41 are clamped together by a pair of locking collars 44 equipped with appropriate set screws 45 as will become more apparent. Each of the brush locking collars 44 are also equipped with interconnect holes 46 for use in interconnecting the brushes 41 to the brush end 40 as will become more apparent.

Each of the brushes 41 includes a central support spool 48 with opposed annular flanges 49 which forcibly grip radially extending brass bristles 50 therebetween. In the brush set 42 illustrated, there are a pair of end brushes designated individually $41_E$ and a plurality of intermediate brushes $41_I$. The end brushes $41_E$ are each provided with an outwardly directed positioning end 51 sized to be received in the interconnect holes 46 on the brush locking collars 44. Thus, when the locking collars 44 are pressed toward each other clamping the brushes 41 therebetween and the locking collars and end brushes $41_E$ are positioned so that positioning pins 51 fit in the interconnect holes 46, the brushes 41 will be locked in position on the shaft 40 and prevented from rotating relative to the shaft as the shaft 40 is rotated. While the bristles 50 may be of any material, brass has been found to work best against the tungsten carbide coating on the surface of the load drum. Also, while the diameter of the brushes 41 may be different without departing from the scope of the invention, the diameter illustrated is about three inches.

The drive assembly 14 includes a frame drive unit 55 and a brush drive unit 56. The frame drive unit 55 serves to rotate the pivot shaft 29 in the brackets 26 to pivot the base plate 20 toward and away from the peripheral surfaces PS of the load drum LD. The brush drive unit 56 serves to rotate the brush assembly 12 relative to the peripheral surface PS.

The frame drive unit 55 includes a vane-type rotary actuator 58 which is pneumatically powered to rotate its output shaft 59 clockwise or counterclockwise, depending on which fluid inlet 60 is supplied with pressurized fluid. The output shaft 59 is connected to the shaft connector 32 and keyed thereto so that the output shaft 59 serves to rotate the pivot shaft 29 and thus the space plate 20 toward and away from the peripheral surface PS. Fluid is supplied to the inlets 60 via a solenoid valve 61 controlled by the machine control circuit as will become more apparent. When the solenoid valve is in its actuated position, fluid is supplied to the appropriate inlet 60 to cause the output shaft 59 to rotate the base plate 20 toward the peripheral surface PS and when the solenoid valve 61 is deactivated, the reverse is the case. The fluid under pressure is applied to the solenoid valve 61 through a pressure regulator 62 schematically seen in FIG. 3 so that the pressure exerted on the vane within the rotary actuator 58 can be selectively adjusted so that the force applied to the peripheral surface PS by the brush assembly 12 can be regulated. Typically, the point at which the load drum motor LDM is detactivated is about ten psi and the regulator 62 is adjusted so that the force applied to the surfaces PS by the brush assembly 12 is less than this value, usually about 8 psi.

The brush drive unit 56 includes a drive motor 64 mounted on the central section 21 of the base plate 20 so that its drive shaft 65 projects outwardly on the same side of the base plate 20 as the brush shaft 40 and is oriented so that the motor axis is parallel to the axis of the brush shaft 40 and the pivot shaft 29. A drive pulley 66 is mounted on the drive shaft 65 while a driven pulley 68 is mounted on the end of the brush shaft 40. A drive belt 69 drivingly connects the drive and driven pulleys 66 and 68 to rotatedly drive the brush assembly 12. While different rotational speeds may be provided by the motor 64, an output speed of about 1750 RPM has been found satisfactory with an one-to-one drive between the motor drive shaft 65 and the brush shaft 40.

To protect the mechanism against debris being brushed from the peripheral surface PS of the drum LD, an arcuate brush ccover 70 is provided in the covers 15 while an appropriate belt cover 71 is provided to cover the pulleys 66 and 68 and drive belt 69.

On the uniformity machine TUO, the operator manually enters to load setpoint radial value, commonly 1,000 pounds, in the machine control circuit. This will cause the load drum LD to radially load the tire at about the setpoint value. The circuit also has an automatic radial zero feature that will automatically rezer the setpoint value if the load on the load drum LD exceeds some unloaded threshhold force while drum LD is not loading the tire. This unloaded threshhold force is commonly about 10 pounds. After the load drum loads the tire tread to the loaded setpoint value and the load drum carriage LDC stops movinhg the load drum, the tire goes through its warm-up cycle, usually about two seconds, before the radial force variation measurements are taken, usually for about one second.

FIG. 5 illustrates the cleaner control circuit 75 incorporated in the machine control circuit MCC. The circuit 75 includes a selector switch 76 with an open contact 76$_O$, a manual contact 76$_M$ and an automatic contact 76$_A$. The common contact 76$_C$ is connected to the solenoid SOL of the valve 61 and the coil MR-C of a motor relay MR in parallel with each other. A manually operable switch arm 76$_R$ selectively connects the contact 76$_C$ with each of contacts 76$_O$ 76$_M$ or 76$_{76A}$. Contact 76$_M$ is connected to the common circuit hot wire while the contact 76$_A$ is connected to the hot wire through the load control switch network SN. The operator manually sets the selector switch 76.

The relay MR has a normally open sets of contacts MR-2, 3 and 4 which connect the drive motor 64 to the appropriate power source and remain closed as long as the coil MR-C is energized.

Thus, in the automatic mode, the relay MR is activated when the switch network SN closes to engergize the load drum carriage control relay LDR so that the solenoid SOL trips the value 61 to supply air to the rotory actuator 56 and moves the brush assembly 12 toward the peripheral surface PS of the drum LD. At the same time, the brush drive motor 64 is operated to rotate the brush assembly 12. Because exceeding the automatic zero threshhold pressure resets the machine TUO, the pressure output from the pressure regulator 62 is set to maintain the pressure of the bristles 50 in the brush set 42 below this zero therehhold force, ususally about ten pounds. The relay MR is de-energized when the drum LD is loaded to its radial setpoint, usually about 1,000 pounds. This retracts the brush assembly 12. It will also be appreciated that, when the force variation measuring operation is complete and the circuit SN again energized to retract the carriage away from the tire, the cleaning cycle will be repeated, thereby insuring good cleaning of the load drum. The brushes also serve to rotate the drum when they are in contact with the drum to assist in insuring that the entire periphery of the load drum is cleaned with sufficient frequency to prevent any material buildup thereon.

What is claimed as invention is:

1. An automatic load drum periphery cleaner for a force variation tire uniformity machine that radially loads an inflated pneumatic vehicular tire mounted on the machine spindle using a load drum rotatably mounted in a carriage moveable toward and away from the tire tread to radially load same under a perscribed load comprising:

a mounting frame operatively associated with said load drum;

a cleaning brush assembly rotatably mounted on said mounting frame; and drive means for effecting relative rotation between said cleaning brush and loading drum and for casing said cleaning brush assembly to engage the loading drum periphery so that said cleaning brush assembly cleans the loading drum periphery.

2. The cleaner of claim 1 wherein said drive means includes brush drive means for selectively rotating said cleaning brush assembly and frame drive means for selectively moving said mounting frame relative to said loading drum.

3. The cleaner of claim 2 wherein said cleaning brush assembly and the load drum rotate about substantially parallel spaced apart axes.

4. The cleaner of claim 3 wherein said mounting frame is pivotally mounted on said load drum carriage about an axis substantially parallel to the load drum axis.

5. The cleaner of claim 1 further including control means for activating said drive means while the load drum is moving toward the center of the tire and for disabling said drive means during variation measuring and/or correction of the vehicular tire.

6. The cleaner of claim 5 wherein said force variation uniformity machine includes carriage drive means for moving said carriage toward and away from the tire tread, load sensing means for detecting the load on said load drum, and carriage means for disabling said carriage drive means when the sensed load on the load drum while it is unloaded exceeds a prescribed rezero threshhold value; and wherein said drive means is further constructed and arranged to load the load drum periphery with said cleaning brush assembly to a value less than said precribed threshhold value.

7. The cleaner of claim 1 further including control means for activating said drive means to cause said rotating cleaning brush assembly to engage the load drum periphery as said loading drum is moved toward engagement with the tire.

8. The cleaner of claim 6 wherein said control means further activates said drive means to cause said rotating cleaning brush assembly to engage the load drum periphery as said loading drum is moved away from engagement with the tire tread.

9. The cleaner of claim 8 wherein said force variation uniformity machine includes carriage drive means for moving said carriage toward and away from the tire tread, load sensing means for detecting the load on said load drum, and carriage control means for disabling said carriage drive means when the sensed load on the load drum while it is unloaded exceeds a prescribed threshhold value; and wherein said drive means is further constructed and arranged to load the load drum periphery with said cleaning brush assembly to a value less than said presribed threshhold value.

10. The cleaner of claim 9 wherein said control means deactivates said drive means when the load drum loads the tire to a load setpoint value.

11. The cleaner of claim 7 further including load adjustment means for selectively varying the load exerted on the load drum by said cleaning brush assembly.

12. The cleaner of claim 1 further including control means for activating said drive means to cause said rotating cleaning brush assembly to engage the load drum periphery as said loading drum is moved away from engagement with the tire tread.

13. The cleaner of claim 1 wherein said cleaning brush assembly includes a plurality of metal bristles adapted to engage the load drum periphery.

14. The cleaner of claim 13 wherein said metal bristles are brass.

15. The cleaner of claim 14 wherein said cleaning brush assembly includes a plurality of brushes arranged side-by-side with each other along a common axis, each of said brushes including a central mounting member mounting a plurality of said brass bristles therein extending radially outward from the central axis thereof; and support means for maintaining said brushes in the side-by-side relationship.

16. The cleaner of claim 1 wherein said force variation uniformity machine includes carriage drive means for moving said carriage toward and away from the tire tread, load sensing means for detecting the load on said load drum, and carriage means for disabling said carriage drive means when the sensed load on the load drum while it is unloaded exceeds a prescribed rezero threshhold value; and wherein said drive means is further constructed and arranged to load the load drum periphery with said cleaning brush assembly to a value less than said prescribed threshhold value.

* * * * *